United States Patent [19]

Brakels et al.

[11] Patent Number: 4,813,101
[45] Date of Patent: Mar. 21, 1989

[54] DEVICE FOR THE SELECTIVE TRANSFER OF SLAUGHTERED POULTRY, SUPPLIED ON A CONVEYOR TRACK, TO ONE OR MORE DISCHARGE STATIONS, UNDER CONTROL OF AT LEAST ONE GRADING STATION DISPOSED ALONG THE DISCHARGE CONVEYOR TRACK

[75] Inventors: Gerardus H. M. Brakels, Boxmeer; Josephus van den Nieuwelaar, Gemert, both of Netherlands

[73] Assignee: Stork-PMT B.V., Netherlands

[21] Appl. No.: 93,886

[22] Filed: Sep. 8, 1987

[30] Foreign Application Priority Data

Sep. 10, 1986 [NL] Netherlands .................. 8602287

[51] Int. Cl.$^4$ .............................................. A22C 21/00
[52] U.S. Cl. ........................................ 17/11; 17/24; 198/465.2; 198/803.01
[58] Field of Search ............... 198/465.2, 803.01; 17/11, 24

[56] References Cited

U.S. PATENT DOCUMENTS

| 3,595,368 | 7/1971 | Mantovani | 198/465.2 |
| 4,597,133 | 7/1986 | van de Nieuwelaar | 17/24 |
| 4,660,256 | 4/1987 | Innes et al. | 17/24 X |

Primary Examiner—Willie G. Abercrombie
Attorney, Agent, or Firm—Hurt, Richardson

[57] ABSTRACT

Device for the selective transfer of slaughtered poultry, supplied on a conveyor track, to one or more discharge stations, under control of at least one grading station disposed along the conveyor track, with a control device in each discharge station for removing from the conveyor track poultry selected by the grading station, a buffer device in which the birds to be discharged can be temporarily stored, and a device for taking the birds to be discharged into the desired discharge position.

7 Claims, 8 Drawing Sheets

DEVICE FOR THE SELECTIVE TRANSFER OF SLAUGHTERED POULTRY, SUPPLIED ON A CONVEYOR TRACK, TO ONE OR MORE DISCHARGE STATIONS, UNDER CONTROL OF AT LEAST ONE GRADING STATION DISPOSED ALONG THE DISCHARGE CONVEYOR TRACK

BACKGROUND OF THE INVENTION

As part of the evolution which the processing of slaughtered poultry is going through, there is an increasing need for selection of the said slaughtered poultry—which is supplied on a conveyor track and has undergone all operations as regards removal of the intestines, etc.—according to quality, weight and possibly further processing, for example jointing operations. Set up along the conveyor line for this purpose are grading stations which grade the birds according to different quality aspects such as type, good condition, size colour, weight, etc., and each of which transmits signals which are processed in a computer system which controls an ejection station the moment a particular graded bird reaches this station; the bird is then removed from the conveyor track.

DESCRIPTION OF THE PRIOR ART

Such an installation is described, for example, in the brochure published by the applicants: "Chickway 2/2—electronic on-line grading system".

The birds then have to be conveyed in a particular position to a packing plant, in which packing equipment places the birds individually, or in a particular number, in suitable packs.

Further processing of the poultry in a number of so-called jointing stations, along which the birds are conveyed, hanging by the legs, and in which they are jointed into portions to be packed separately, is increasingly common: here the particular requirement set is that the birds selected from the conveyor track are taken to a particular position on the jointer track without human intervention.

SUMMARY OF THE INVENTION

The object of the invention is to produce a device by means of which the above-mentioned tasks can be fulfilled. Account must be taken here of the fact that in general the conveyor line will have a greater supply capacity than the discharge capacity of the individual discharge stations, while in practice there is a possibility that the discharge capacity of a particular discharge station will be inadequate to take the supply from the conveyor line, namely when a particular grading unit successively designates a particular number of birds for a particular discharge station. The device according to the invention must be designed in such a way that account is taken of this possibility.

This is achieved according to the invention in that each discharge station comprises a controlled device for removing from the conveyor track poultry selected by the grading station for the particular discharge station, a buffer device in which the birds to be discharged can be temporarily stored, and a device for taking the birds to be discharged into the desired discharge position.

More particularly, the invention relates to a device for the selective transfer of slaughtered poultry hanging by the legs from the first conveyor track to a second conveyor track. Such a device is, according to the invention, characterized in that accommodated between a discharge station cooperating with the first conveyor track and the discharge station cooperating with the second conveyor track is an endless transfer track, having guided along it transfer hooks which can either stop or be driven along this transfer track, along the transfer track in the direction of movement both for the infeed station and for the discharge station there is sufficient space for the accumulation there of a number of empty or bird-carrying transfer hooks, and a first stop, controlled by the grading station, is arranged for release of transfer hooks one by one to a position for cooperation with the first conveyor track for removal of a bird from this conveyor track, and a second stop is arranged for the release of a bird-carrying transfer hook to a position for working in concert with the second conveyor track.

Since the position between the grading station and the infeed station is fixed and known, while the speed at which the hooks move along the first conveyor track is also fixed and known, it is no problem, when the grading station indicates a bird which has to be discharged to the second conveyor track in question, for a signal to be transmitted so that just at the moment at which the bird is approaching the infeed station, the first stop releases the overhang hook which is there in front of it and is still being retained by the stop, and this hook then takes over at the correct moment the bird hanging from the hook of the first conveyor track and transfers it to the discharge station. If a number of birds have already accumulated in front of this discharge station, the overhang hooks in question stop and are released one by one by the second stop at a speed adapted to the speed of movement of the second conveyor track, and taken in such a way in front of the second conveyor track that they can be accommodated there.

The transfer conveyor track is preferably designed as a fixed circular first ring, coaxial with a rotary second ring, and the transfer hooks are guided on the first ring and are provided with friction blocks for cooperation with the second ring.

In particular, if the birds selected have to be conveyed to an installation of the type in which the birds undergo a number of successive jointing operations, and in which they are moved forwards with their legs clamped against fixed guides, the device according to the invention is characterized in that in the first conveyor track the birds are moved along ha ug by the legs from suspension hooks, and in the second conveyor track are moved along with their legs clamped against fixed guides, the plate-shaped overhang hooks are designed with take-up slots, the first conveyor track at the infeed station, where the birds are pressed by a guide disposed along the conveyor track out of the hooks into the overhang hooks, is tangent to the overhang conveyor track, and the second conveyor track at the discharge station, where the birds are pressed by an ejector from the overhang hooks between the conveyor track guides, is at right angles to the overhang conveyor track.

Advantageous embodiments are described in claims 5 and 6, it being pointed out that the grading device can be a weighing device.

DESCRIPTION OF PREFERRED EMBODIMENTS

Figure 1:
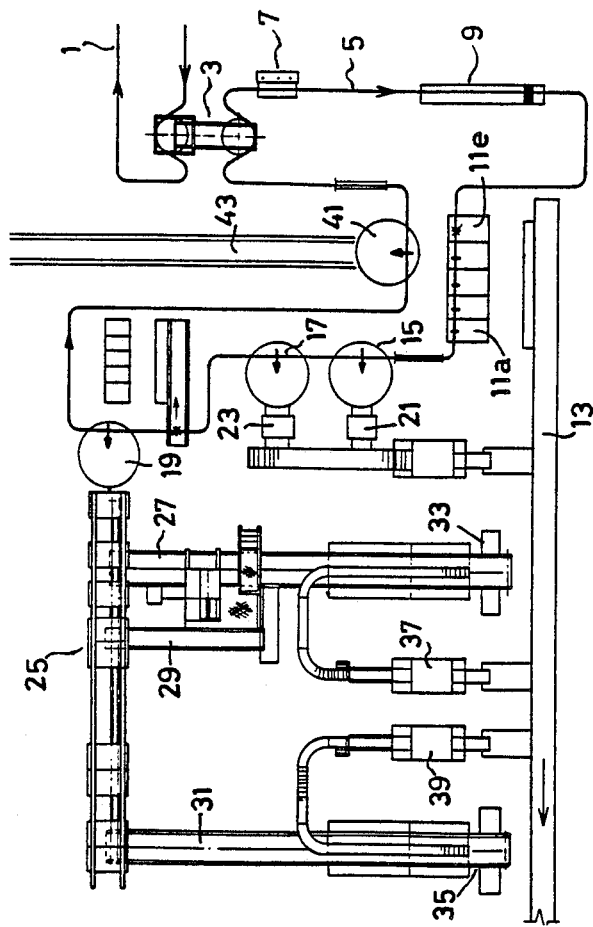
FIG. 1 is a general drawing of a complete plant for the grading and transfer of poultry to different dividing and processing stations.

In FIG. 1, reference numeral 1 denotes a feed track for dry, pre-cooled poultry, which by means of an overhanging device 3 is transferred to the conveyor track 5. Such an overhanging device can, for instance, be of the type in which the poultry, arriving on a first conveyor track, is successively taken-off this track 1 in an input station ajoining said track by transfer units which move in a closed path and transfer the poultry to an output station where they are successively taken-off the transfer units and transferred to the second conveyor track 5. In this track the poultry moves in the direction of the arrows.

The poultry then passes a grading station 7 and a weighing station 9 which in combination with a central computer controls a number of ejecting stations in which the poultry is taken-off the conveyor track dependent on certain qualities, such as, for instance, its weight. Stations of this kind are known in itself.

Reference numerals 11a–11e denote ejector stations by means of which the poultry is ejected from the conveyor track 5 under the control of the signals transmitted by the central computer of the stations 7 and 9 and falls into suitable collection containers for bulk packing; it is discharged via the discharge conveyor track 13. Such ejector stations are known in the art.

Reference numbers 15, 17, 19 and 21 denote overhangers of the type which are the subject of the present application, thus by means of which the poultry is discharged in a particular position. In stations 15 and 17 the poultry is discharged to packing stations 21 and 23 respectively, in which the poultry is packed by weight, while the transfer device 19 takes the poultry to a so-called jointing line 25, in which the poultry is jointed into separate portions suitable for consumption. Such a line comprises a number of processing stations, which are known in itself, for instance, for cutting-off the wings by means of rotating cutting knives (as described in EP-A-0159076), for removing the tail by means of a stationary cutting knife 9 as described in EP-A-0159744) and for removing the legs by means of two stationary toothed cutting knives of the poultry (as described in EP-A-0164167). Each of the above cited European patents is herein incorporated by reference. By means of discharge conveyor tracks, a number of which are shown and indicated by reference numbers 27, 29 and 31, the portions separated off in the processing stations of the jointing line are discharged and, for example, taken away in bulk (the discharge stations 33, 35) or separately in particular numbers packed by weight (the packing stations 37, 39).

Finally, the conveyor track 5 passes the overhang device 41, in which certain birds are discharged to a conveyor track 43, for undergoing yet other operations.

Below, there will now follow a description of an embodiment of the device according to the application, which is intended in particular for supplying poultry to the jointing conveyor track 25 in a particular position, i.e. in fact the design of the overhang device 19.

Figure 2:
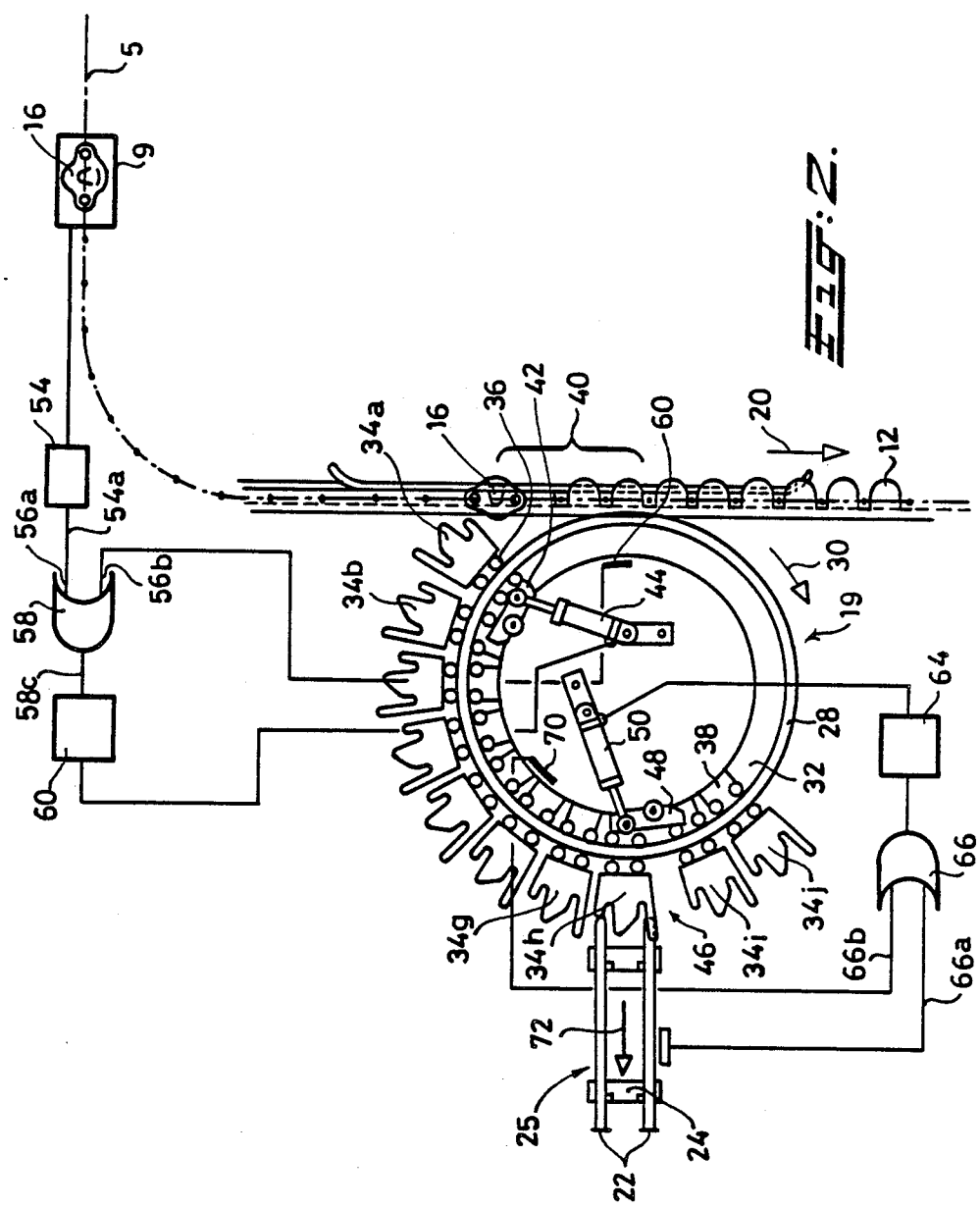
FIG. 2 is a schematic top view of a preferred embodiment of the device according to the invention, intended in particular for the transfer of selected birds to a so-called jointing line.

FIG. 2 shows schematically the supply conveyor track 5 for slaughtered poultry hanging by the legs from suitable suspension hooks 12, which are known per se. Also shown is the weighing station 9, in which the weight of each passing bird, such as the bird 16, is determined in a manner known per se. It is assumed, for example, that if the weight of this bird lies within a predetermined weight range, for example, between 1,000 and 1,400 grammes, the bird has to be transferred to the jointing conveyor track 25, in which the bird is jointed by a number of jointing stations into individual portions, each suitable for consumption. Other birds have to be conveyed further by the conveyor track 5 in the direction of the arrow 20 to the next identical selective transfer stations 41, in which they are transferred to another conveyor track (see FIG. 1).

As already stated, the birds hang at the track 5 by the legs on conveyance hooks: the conveyor track 25 is of the type in which the birds are clamped by the legs between fixed guides 22, and carriers 24 cooperating therewith.

The transfer station 19, in which this transfer from the conveyor track 5 to the conveyor track 25 is effected, comprises a fixed circular, annular track 28 having concentrically thereto a drive ring 32 which is driven continuously in the direction of the arrow 30, said two elements cooperating with the overhang hooks 34a ... 34j, which are each guided by means of sets of bearing rollers 36 on the stationary outer ring 32 and by means of friction blocks 38 are slippingly driven by the rotating inner ring 32. The structure of these overhang hooks will be explained in detail below.

The device comprises an infeed station 40, preceded as seen in the direction of movement of the drive ring 32, by a stop 42, which is controlled by a pneumatic or hydraulic cylinder 44, and a discharge station 46, preceded as seen in the above-mentioned direction of movement, by a stop 48, which is controlled by the pneumatic cylinder 50. As can be seen from the figure there is, as seen in the direction of movement, between the discharge station 46 and the infeed station 40 a zone along which a number of hooks can accumulate, in this case the hooks 34a to 34g; there is also looking in the direction of movement—between the infeed station 40 and the discharge station 46 a zone in which a number of hooks can accumulate, in this case the hooks 34i and 34j. The hooks 34h and 34i are retained by the stop 42, while the hooks 34h and 34i are retained by the stop 48; the other hooks are driven in slipping fashion and rest against each other.

In order to ensure proper functioning of the device, there are a number of other elements, which will be described below in the explanation of the working device.

The device operates as follows:

When the weighing device 9 detects a bird whose weight falls within such a range that the bird has to be discharged to the track 25, the weighing device 9 gives a signal to computing and selection device 54, which determines when the bird in question, taking into account the speed of movement of the conveyor track 5, arrives at the infeed station 40, and which at the right moment at its outlet 54a transmits a control signal to the inlet 56a of the gate 58; the second inlet 56b of this gate 58 is connected to a suitable detector 60, disposed near the infeed station 40, which detector in the absence of a hook delivers a release signal to the second inlet 56. When this release signal is present, the occurrence of a control signal at the inlet 56 will result in an output signal to the outlet 58c of the gate 58, which controls the control device 60, which results in the cylinder 44 being energized briefly. As a result, the hook 34a is released and the hook 34b moves up one place; the hook 34a is taken along by the ring 32 and arrives at the start of the infeed station just when the hook with bird 16 arrives there. As will be explained below, the hook 34a takes over the bird from the hook 16 because the fixed guide 41 presses the bird out of the hook 12 into the hook 34a and is then transferred at a speed which is practically the same as that of the supply conveyor track 10 in the direction of the arrow 30 to the discharge station.

Since the speed of the conveyor track 25 is lower than that of the conveyor track 5, there will thus always be overhang hooks with birds in the zone upstream of the discharge stations, and these hooks are released one by one by the stop 48 and pressed by a carrier, not shown in this figure, into the discharge conveyor track 25; this will be explained further. The stop 48 is controlled by the cylinder 50 by means of a control device 64, which is controlled from the gate 66, whose inlets 66a, 66b are connected to the conveyor track 18.

The detector 70 transmits a release signal when there is no hook in front of it, in other words: when the zone downstream of the discharge station is not completely full of empty hooks, and if this condition is met, the control signals will operate the inlet 66a and then the actuating cylinder 50, so that the bird-carrying hooks are conveyed one by one before the conveyor track 25. The bird is then removed from the hook, fed into the conveyor track, and discharged in the direction of the arrow 72.

Figure 3:
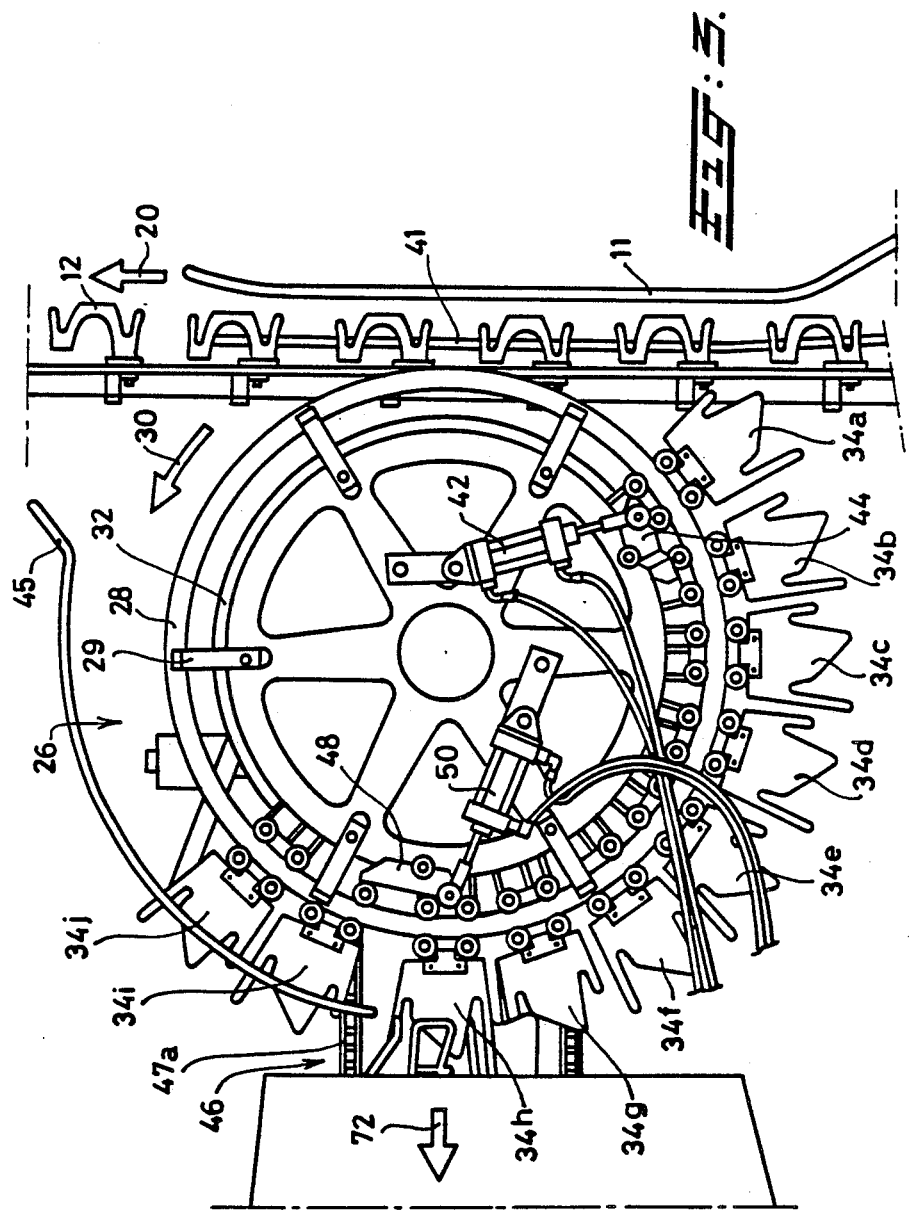
FIG. 3 is a bottom view of this embodiment.

FIG. 3 shows a bottom view of the transfer station 26. The figure shows the supply conveyor track 5 with thereon the hooks 12; the conveyor track moves in the direction of the arrow 20. Disposed shortly before the infeed station is a guide bracket 11, which is for preventing the pushing away of the hooks 12 during removal of the birds. If the hook 34a directly in front of the infeed station is then released by the stop 44 operated by actuating cylinder 42, this hook will take over the bird from the hook 12 and convey it in the direction of the arrow 30 to the discharge station 46. Upstream of this discharge station is a guide bar 45 which ensures that the bird remains properly in the hook directly in front of the discharge station until the moment of discharge, in this case that it remains in the hooks 34j an 34i, and is not slung out.

Figure 7:
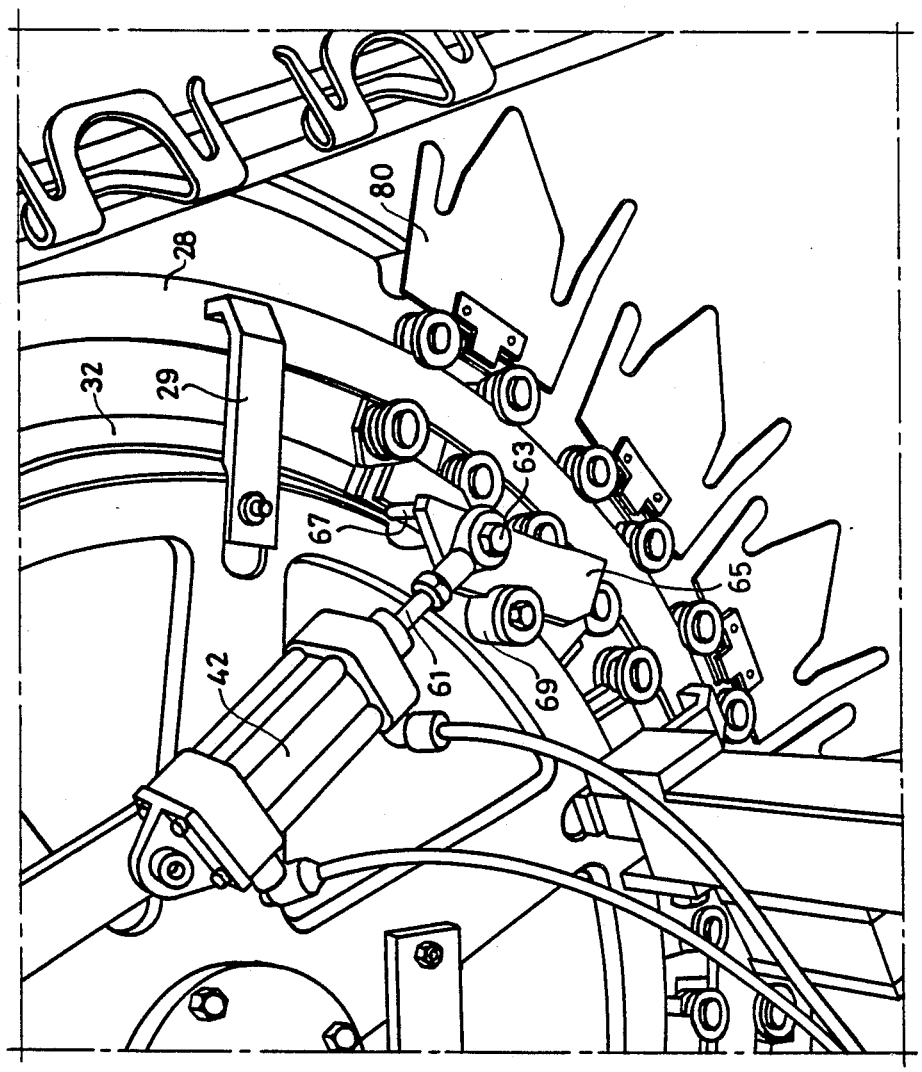

The discharge of the birds from the discharge station, and the transfer thereof to the discharge conveyor track 25 take place under the influence of carriers which are fixed between the endless chains 47a, 47b, one of which is shown by reference number 49, and is partially visible in FIG. 7. The linear speed of the chains 47a, 47b is about one and a half times that of the discharge conveyor track 25, so that it is ensured that a bird brought in is always taken in front of the inlet of the conveyor track before the arrival of the pushing and retaining element of the conveyor track 18.

Figure 4:
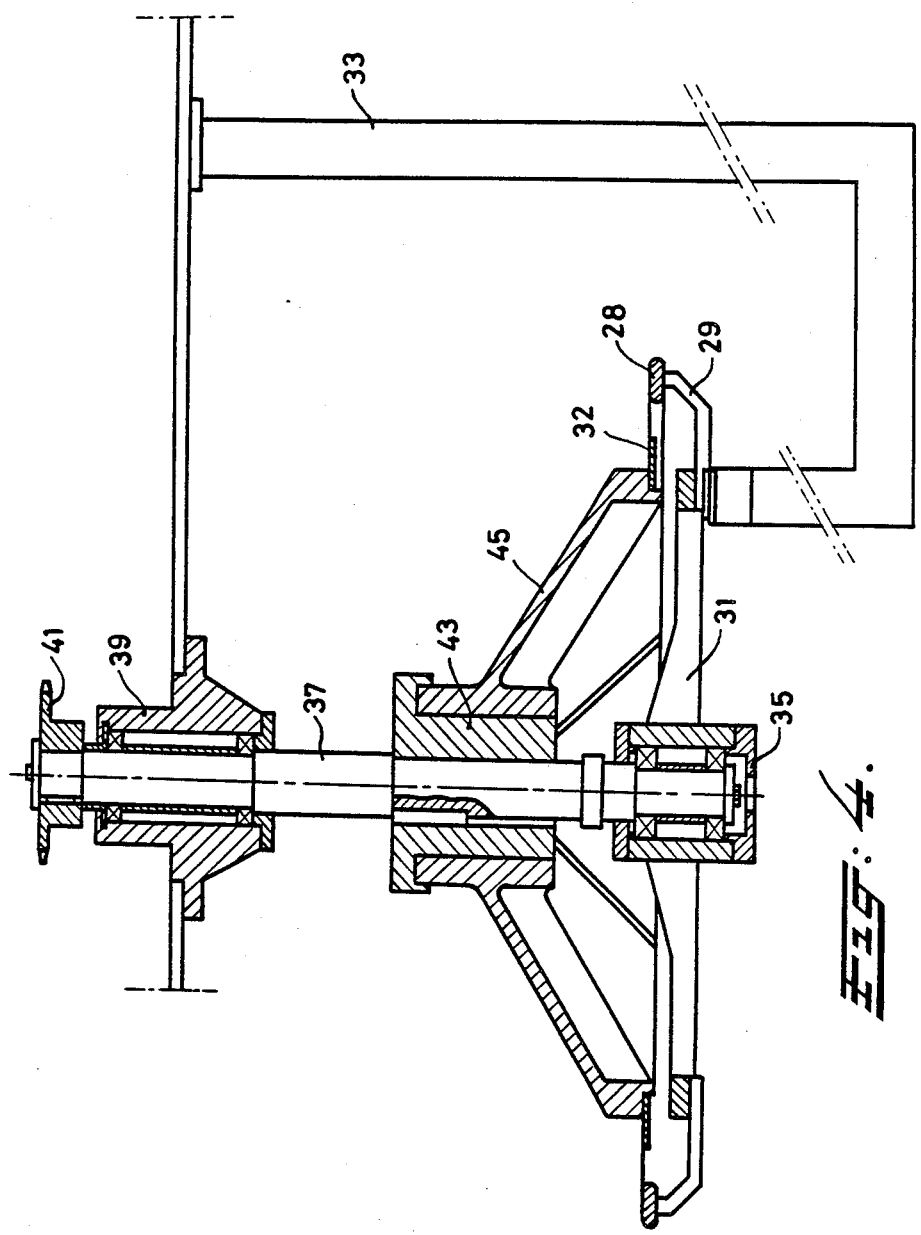
FIG. 4 is a schematic side view of the transfer conveyor track.

FIG. 4 shows schematically the stationary annular conveyor track 28, fixed by means of the carrier arms 29 to the central carrier 31, which is supported by the frame 33; supported in the central bearing box 35 is the end of the shaft 37, which at the top side is supported in the bearing-box 39, and is provided with the drive gear 41. Fixed on the shaft 37 is a carrier 43 with arms 45, on the end of which the drive ring 32 is fastened.

Figure 5:
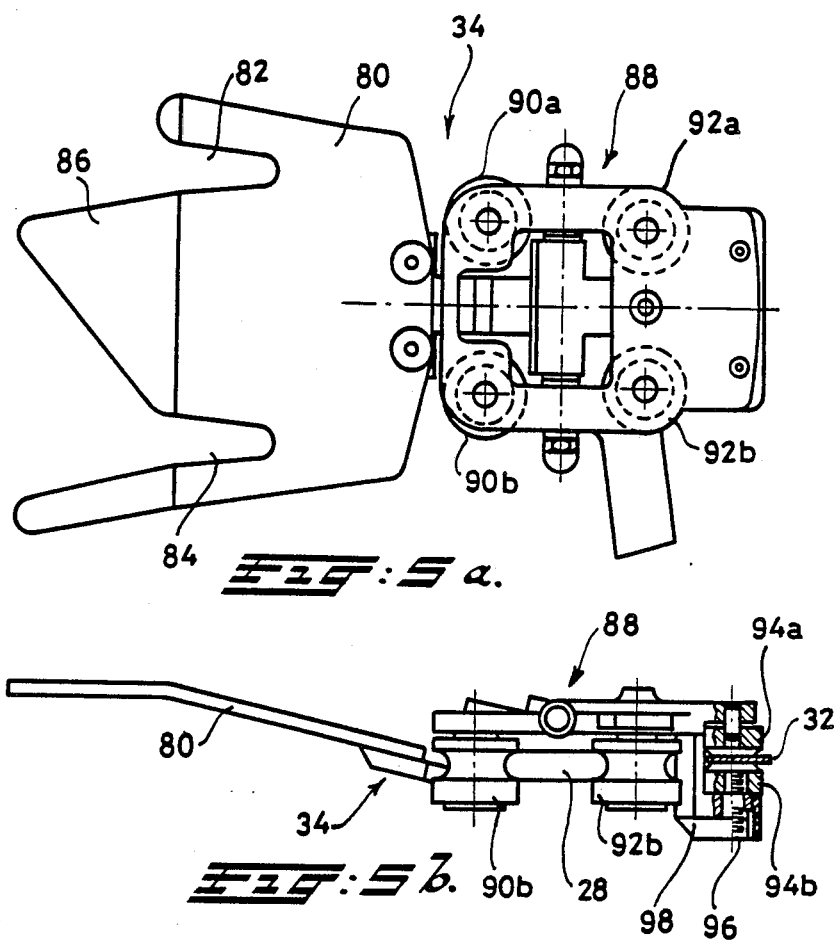

The design of the overhang hooks can be seen from FIGS. 5a and 5b. The hook, shown in its entirety by reference number 34, consists of a plate-like element 80, with infeed and guide grooves 82, 84, separated from each other by an asymmetrical, wedge-shaped intermediate part 86; the plate-shaped part is fixed to the carriage 88, which bears the two parts of guide rollers 90a, 90b and 92a, 92b, which work in concert with the annular conveyor track 28. The carriage 88 also bears on the righthand open side two friction blocks 94a, 94b, which are opposite each other, and the latter of which is under the influence of the pressure spring 96; the friction blocks are on either side of the driving track 32. These friction blocks under a spring ensure slipping drive of the overhang hook 34.

Figure 6:
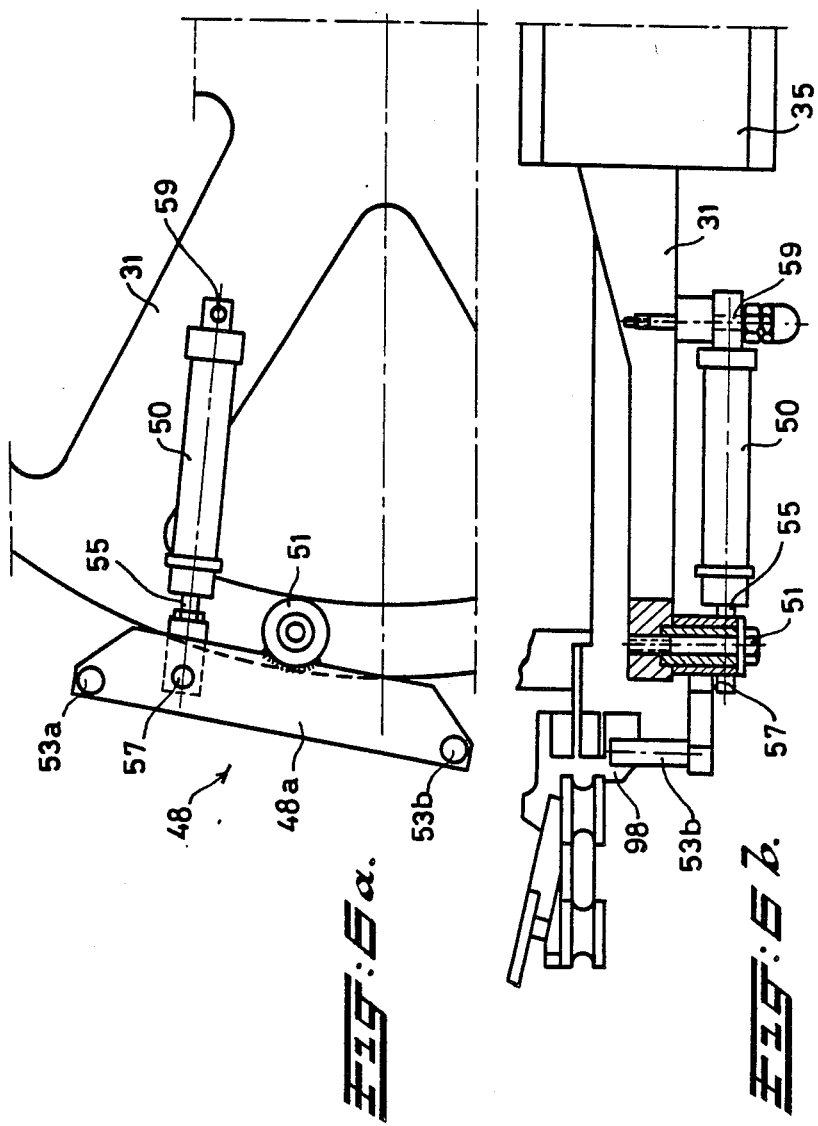

Each overhang hook 34 bears a stop boss 98, which is also seen in FIG. 6b, this figure in conjunction with FIG. 6a showing the working of the controllable stops 44, 48. Each controllable stop, such as the stop 48, has a tilting arm 48a which can rotate about the fixed pivot point 51 and on each of the ends bears a stop pin 53a, 53b. The piston rod 55 of the actuating cylinder 50 is connected in the eccentric hinge pint 57 to the arm 48a, while the cylinder 50 is itself hingedly connected to the stationary part 31 at the point 59. The effect of these measures is that on brief expansions and retraction of the piston rod 55 the overhang hook retained by the pin 53b (in FIG. 8 the overhang hook 34h) and the overhang hook retained by the pin 53a (in FIG. 8 the overhang hook 34i) are both released; the hook 34i moves further in the direction of the arrow 30 and is retained by the pin 53b, in the position for the overhanging of a bird hanging in the hook in the conveyor track 18, while the hook 34j also moves up a position and takes over the position which was previously held by the hook 34i. The released empty hook moves to the stop 42 and comes to rest against a foregoing hook.

Figure 8:
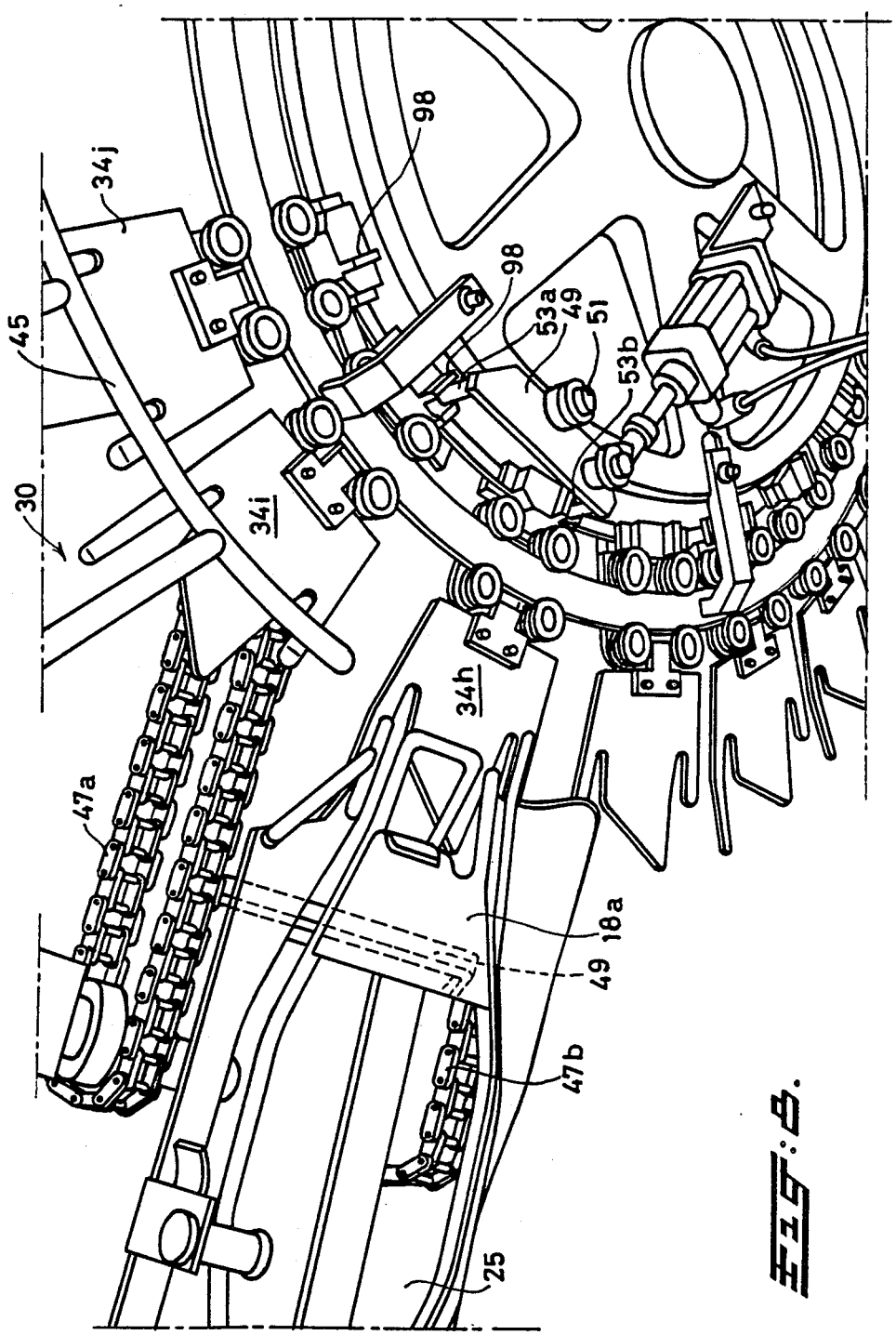

FIG. 8 shows also the chain 47b, which together with the chain 47a bears the carrier 49, for pressing out of the discharge station the bird hanging in the hook 34a, for bringing it into the infeed section 18a of the discharge conveyor track 25. This conveyor track forms no part of the invention and will not, therefore, be described in detail.

Finally, FIG. 7 shows on an enlarged scale a part of the infeed station with the actuating cylinder 42, whose piston rod 61 at 63 is linked to the tilting arm 65, which, like the tilting arm 49, is provided with two stop pins, one of which can be seen and is indicated by reference FIG. 69. After the above, the operation thereof needs no further explanation.

What is claimed is:

1. Device for the selective transfer of slaughtered poultry, supplied on a conveyor track, to one or more discharge stations, under control of at least one grading station disposed along the conveyor track, each discharge station comprises a control device for removing from the conveyor track poultry selected by the grading station for the particular discharge station, a buffer device in which the birds to be discharged can be temporarily stored, and a device for taking the birds to be discharged into the desired discharge position.

2. Device according to claim 1, in particular for the selective transfer of slaughtered birds, hanging by the legs from the first conveyor track to a second conveyor track, in which accommodated between an infeed station cooperating with the first conveyor track and the discharge station cooperating with the second conveyor track is an endless transfer track, having guided along it transfer hooks which can either stop or be driven along this transfer track, along the transfer track in the direction of movement in front of both the infeed station and the discharge station there is sufficient space for the accumulation there of a number of empty or bird-carrying transfer hooks, and a first stop, controlled by the grading station, is arranged for the release one by one of transfer hooks to a position for cooperation with the first conveyor track for removal of a bird from this conveyor track, and a second stop is arranged for the release of the bird-carrying transfer hook to a position for cooperating with the second conveyor track.

3. Device according to claim 2, in which the transfer conveyor track is preferably designed as a fixed circular first ring, coaxial with a rotary driven second ring, and the transfer hooks are guided on the first ring and are provided with friction blocks for cooperation with the second ring.

4. Device according to claim 1, in which in the first conveyor track the birds are moved along hanging by the legs from suspension hooks, and in the second conveyor track are moved along with their legs clamped against fixed guides, the plate-shaped overhang hooks are designed with take-up slots, the first conveyor track at the infeed station, where the birds are pressed by a guide disposed along the conveyor track out of the hooks into the overhang hooks, is tangent to the overhang conveyor track, and the second conveyor track at the discharge station, where the birds are pressed by an ejector from the transfer hook between the conveyor track guides, is at right angles to the overhang conveyor track.

5. Device according to claim 2, comprising detectors disposed along the overhang conveyor track, for determining the number of overhang hooks accumulated in front of the infeed station or discharge station, while the control device for the first and second stop is designed in such a way that the first stop cannot be released when the number of hooks accumulated before the second stop exceeds a particular value, and the second stop cannot be released when the number of hooks accumulated in front of the first stop exceeds a predetermined value.

6. Device according to claim 3, in which each stop has a tilting arm which hinges about a shaft which is parallel to the rotary shaft of the second ring, said arm being designed with two spaced stops, each cooperating with a boss on each of the overhang hooks.

7. Device according to claim 1, in which the selection device is formed by a weighing device.

* * * * *